INVENTORS
LOUIS A. OLLIVIER &
JAMES B. SKITT, Jr.
BY
ATTORNEYS

INVENTORS
LOUIS A. OLLIVIER &
JAMES B. SKITT, Jr.
BY
ATTORNEYS

3,274,833
DIFFERENTIAL PRESSURE TRANSMITTERS

Louis A. Ollivier, Huntingdon Valley, and James B. Skitt, Jr., Chalfont, Pa., assignors to Fischer & Porter Company, Warminster, Pa., a corporation of Pennsylvania
Filed Apr. 23, 1963, Ser. No. 275,002
5 Claims. (Cl. 73—407)

This invention relates to differential pressure transmitters, specifically of a type in which a pressure difference is transmitted in terms of a proportional electrical signal.

The measurement of pressure differences is useful for various purposes and measurement of flow by pressure drop across an orifice is one of the most valuable uses. As is well known, the pressure drop in such a case is proportional to the square of the liquid flow rate. This type of use of a differential pressure meter particularly highlights one of the requirements for satisfactory commercial operation: the pressure difference, sometimes small, must often be measured against the background of a pressure differing from atmospheric pressure to a much greater extent. Independence of this background is important, and it is also highly important that the differential pressure measuring device should not be damaged by an abnormally high pressure difference in the event that some accident occurs as, for example, accidental rupture or substantial leakage in one of the connecting lines of the measuring device, or stoppage of an orifice.

Temperature compensation is required particularly if differential pressure is being measured in connection with a fluid flow line involving variable temperature operation.

Damping is also desirable to maintain steady reading.

Convenient adjustments for various conditions must also be provided.

Desirably, the electrical transmission involved should be as simple as possible and particularly, irrespective of the remoteness of a reading device from the point of measurement, the signals for a particular pressure difference should be the same. Desirably the number of connections should be minimized, and high linearity maintained throughout the measuring ranges.

The general objects of the present invention may be briefly stated to involve the attainment of a differential pressure transmitter which has the desirable characteristics above indicated. These and other objects of the invention will become more apparent from the following description, read in conjunction with the accompanying drawings, in which.

Figure 1:
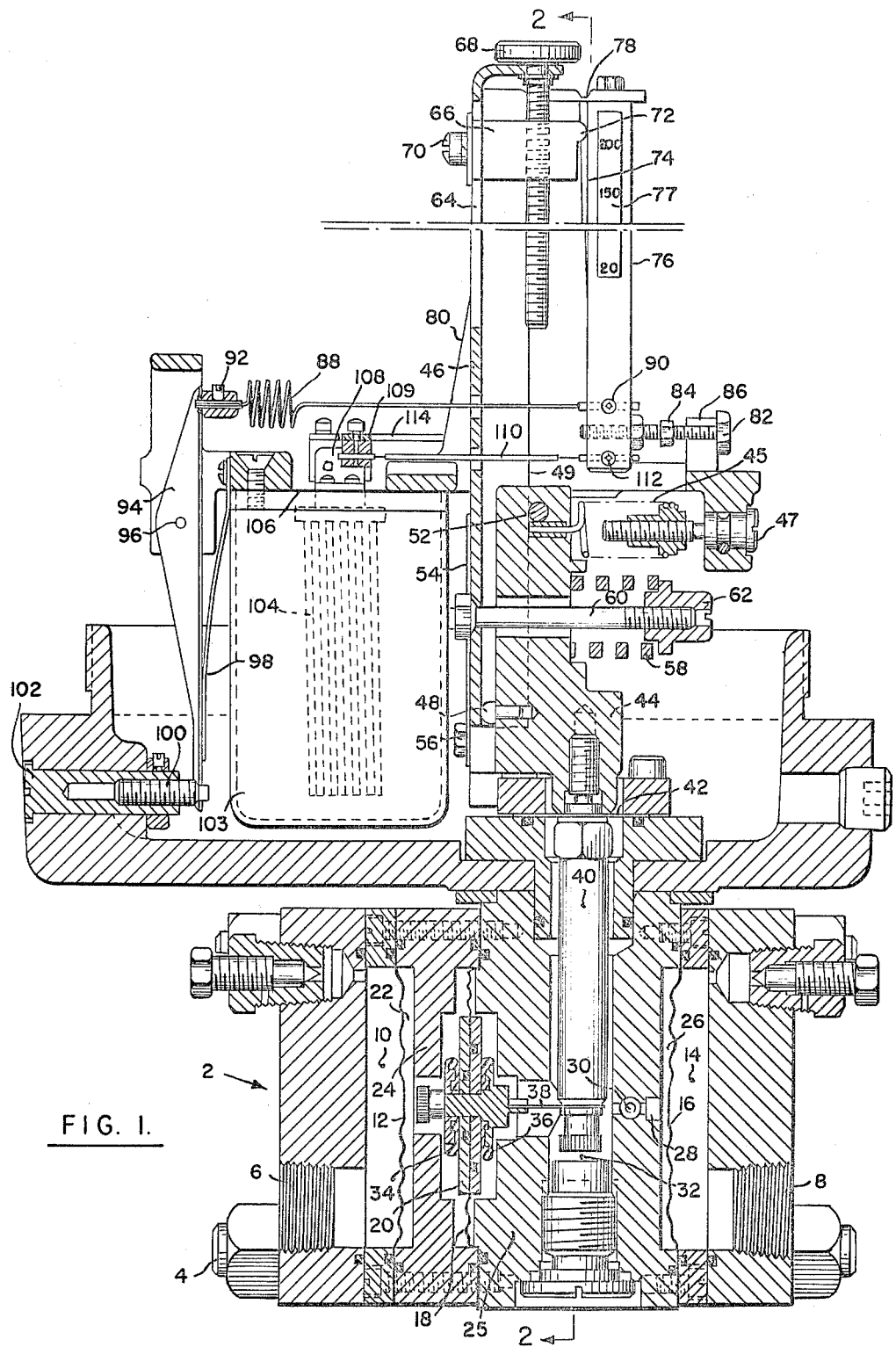
FIGURE 1 is a vertical section taken through a preferred form of transmitter and particularly showing the mechanical parts thereof and their relationship.
Figure 2:
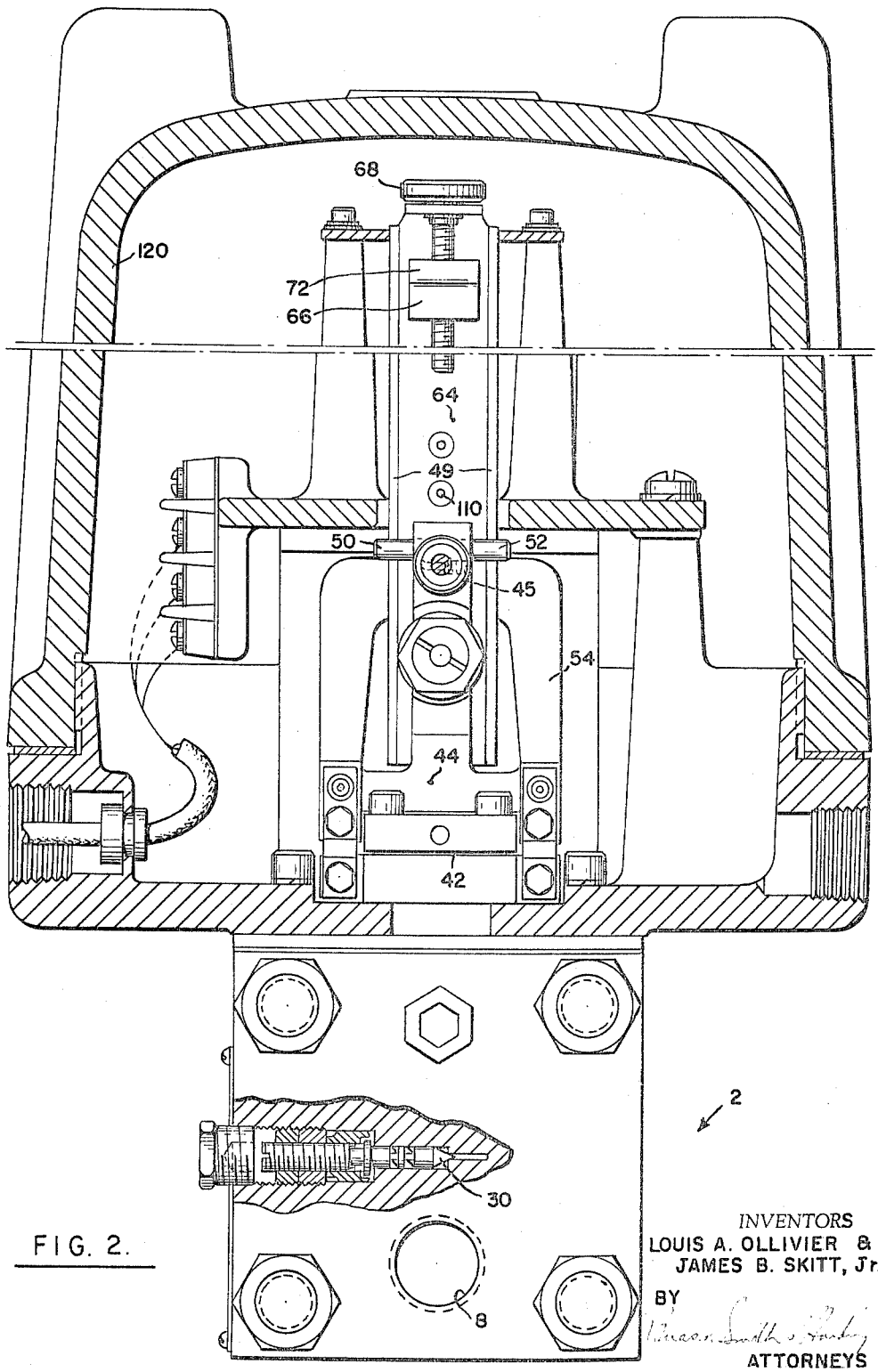
FIGURE 2 is a vertical section taken on the plane generally indicated at 2—2 in FIGURE 1.

The pressure sensing assembly, indicated generally at 2, is made up of a series of stacked elements bolted together and defining chambers. Differential pressures are applied through the passages 6 and 8, the higher pressure being applied through the latter. The passage 6 communicates with the chamber 10 bounded at its right by the corrugated metallic diaphragm 12 having little stiffness. Similarly, the passage 8 communicates with the chamber 14 bounded at its left by the similar diaphragm 16. The diaphragms 12 and 16 are desirably the same to afford temperature compensation.

A diaphragm 18 has a rigid central portion 20 and delimits the chamber 22 between it and diaphragm 12. The periphery of diaphragm 18 is clamped between the elements 24 and 25.

A chamber 26 at the left of diaphragm 16 has communication through a passage 28 controlled by a needle valve 30 with a chamber 32 within the element 25 and to the right of diaphragm 18. The needle valve 30 restricts free communication through the passage 28 to provide viscous damping for stability. Under all ordinary circumstances the diaphragm 18 and its parts are located in the position illustrated so that the full area of the diaphragm is in free communication with the chambers 22 and 32. The central assembly portion 20 of the diaphragm 18, however, is provided with the sealing rings 34 and 36 which, respectively, engage plane surfaces of the elements 24 and 25 to close off communications if by reason of accidentally applied high pressures the diaphragm's assembly moves to the left or right. For example, assume that an abnormally high pressure moves this diaphragm towards the left. The sealing ring 34 will then engage the element 24 trapping liquid at the left of the flexible portion of diaphragm 18. This then provides, in effect, an unyielding backing for the left of the diaphragm so that it cannot be damaged. A similar situation occurs if movement is to the right. To provide pressure transmission and to provide this sealing and safety action the chambers 22 and 32 and the extension 26 of the latter are oil-filled.

A flexible link 38 connects the central assembly of diaphragm 18 to the lower end of a lever 40. Clamped between the lower portion of the lever 40 and its upper portion constituted by a block 44 is a mounting diaphragm 42 of flexible type clamped between fixed elements. This diaphragm by reason of its flexibility provides a pivot for the lever. By shifting it laterally between its clamps adjustment may be made so that pressures applied to thes chamber 32 will not produce flexing of the diaphragm 42 which would tend to pivot the lever.

A bias adjustment spring 45 is connected to the portion 44 of lever 40 to urge it to the right, the tension of the spring being adjustable by the screw and nut arrangement indicated at 47.

An extension of the lever is provided at 46. Normally this is rigid with the lever, and this condition is achieved by urging it against a three point contact arrangement of the lever portion 44 comprising the rounded pin 48 and the ends 50 and 52 of a pin engaged by the flanges 49 of the extension 46 under the action of a strong spring 58 which is compressed between the portion 44 and a nut 62 carried by a screw 60 having a head embedded in a socket in the extension 46. A flexible spring 54 is secured to the extension 46 and anchored at 56 to the portion 44 of the lever. The arrangement provides for breaking of the effective lever in the event that motion is excessive, so that damage is avoided, the breaking action involving yielding of the spring 58.

A slot 64 in the lever extension 46 provides a guide for vertical adjustment of a block 66 under the action of a range adjustment screw 68 journalled in the lever extension and threaded through the block. A locking screw is provided at 70 to clamp the block in adjusted position.

The block 66 is provided with a cylindrical contact portion 72, the axis of the cylinder being perpendicular to the plane of the figure. This is arranged to engage a vertically extending cylindrical portion 74 of a lever 76 which is mounted at its upper end by a flexible supporting member indicated at 78. Rocking of the lever 76 is about an axis att its upper end substantially in line with the contact portion of the cylindrical edge 74 and extending in a direction perpendicular to the plane of FIGURE 1. The lever 76 is provided with a scale indicated at 77 against which the vertically adjusted position of the block contact 72 may be read. The figures on this scale indicate the upper end of the range for which adjustment is made; for example, the figure "200" may in a typical embodiment of the invention represent 200 inches of water meaning that the adjustment of the block contact at this number would cause the instrument to have a differential pressure range between zero and that pressure.

Motion of the lever 76 is restricted by the head 82 of a screw threaded into it and an adjustable nut 84 on this screw arranged to engage the faces of a bifurcated lug 86 carried by the frame. As will more fully be indicated hereinafter, the device operates on a force balance basis to bring the parts to definite positions and consequently free movements of the moving parts may be very slight. A typical adjustment of the stop arrangement just described would limit movement of the lever 76 at the position of the stops to five to ten thousandths of an inch.

A spring 88 takes part in the force balancing operation, and is connected to the lever 76 at 90, and at 92 is connected to the upper end of a lever 94 pivoted to the frame at 96 and urged by a leaf spring 98 into contact with the end of a screw 100 having a non-circular end which is held by the lever against rotation and which screw is axially adjustable by the rotation of the nut 102 journalled in the frame. Adjustment of this nut effects zero adjustment of the tension spring 88.

Within a closed oil-filled chamber 103 there is a restoring motor of a type which is detailed in our application Serial No. 170,408, filed February 1, 1962. The construction of this need not be detailed herein, but it comprises a coil 104 located in the uniform field of a permanent magnet assembly so as to provide a d'Arsonval movement, which has the well-known characteristic of providing a torque accurately proportional to current through the coil. Pivotal mounting for the coil is provided by a diaphragm 106 of flexible type which closes the upper end of the chamber 103. The diaphragm is clamped between the coil carrier and an assembly indicated at 108 above the diaphragm. The assembly 108 is connected by a flexible link 110 to the lower end of lever 76 where it is clamped by a screw 112. The connection at the left of this link is made through a block which is carried by an arm 109 secured to the chain assembly 108. This arm 109 is formed of a bimetallic strip which flexes with varying temperature to adjust effectively the lever arm to which the link 110 is connected. This compensation takes care of the fact that the magnetic field of the permanent magnet will vary slightly with temperature. In brief, the arrangement is such that the pull on the link 110 is accurately proportional to the current through the coil 104.

Figure 3:
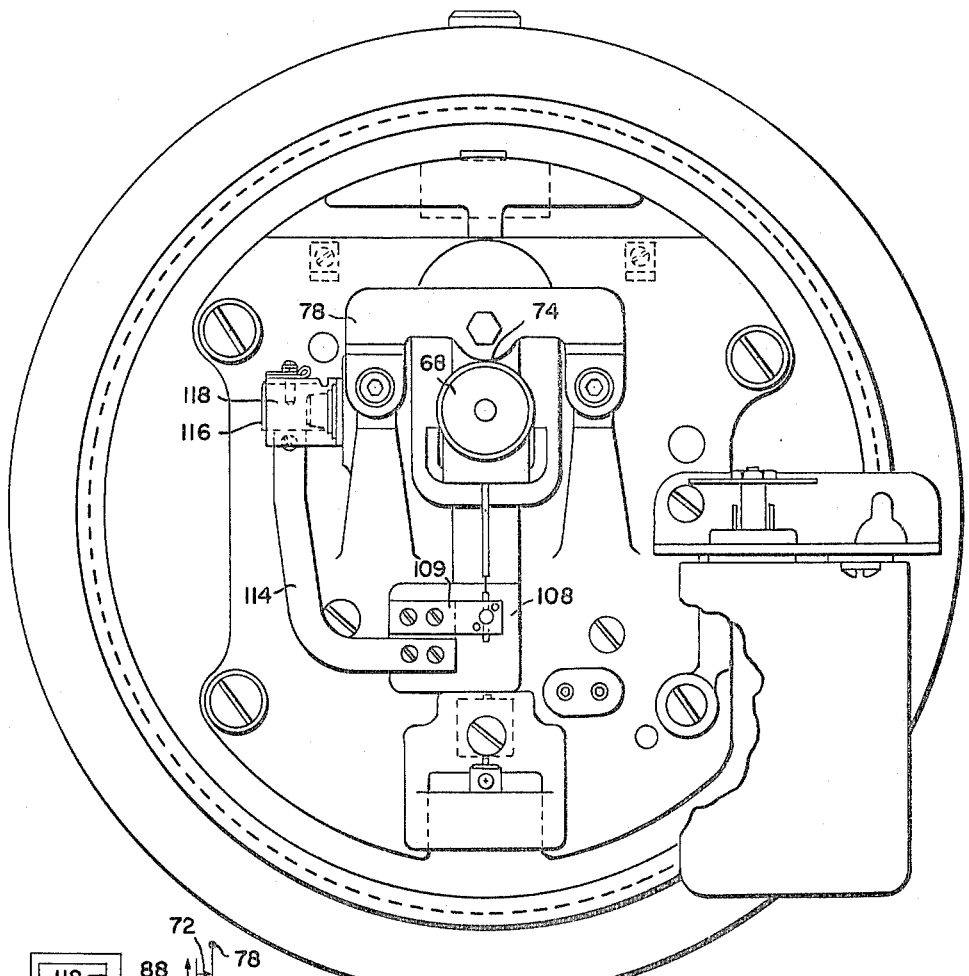
FIGURE 3 is a plan view of the transmitter.

An arm 114 carried by the assembly 108 provides magnification of angular deviations by reason of its length and carries, as indicated in FIGURE 3, a ferrite element 116 which, by reason of the mounting arrangement, will move upwardly and downwardly with respect to the ferrite core of a detector coil 118 to which further reference will be made in connection with discussion of the electrical aspects of the device. The relative motion here involved is only of the order of a thousandth of an inch for full range of operation, and hence the relative position of the element 116 and the core of the coil 118 determine to a high degree of accuracy the zero or null condition of the device.

A cover 120 protects the operating parts against dust or damage. The electrical parts of the apparatus which are indicated but need not be described as to physical form are also enclosed within this cover.

Figure 4:
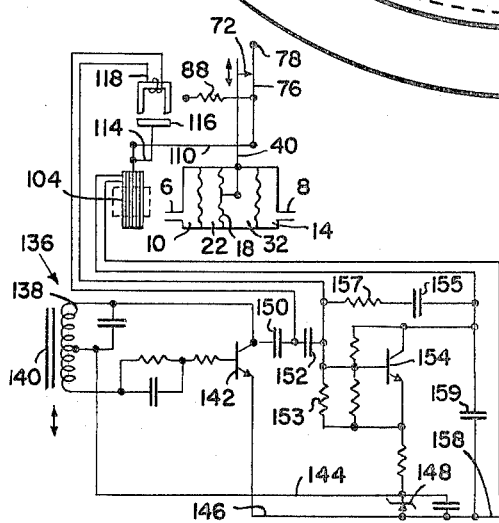
FIGURE 4 is a schematic diagram particularly indicating the electrical elements of the transmitter.

The electrical circuitry involved may be explained with particular reference to FIGURE 4 which also diagrams the mechanical aspects of the apparatus which have already been described in detail.

A transistor oscillator is provided at 136 which operates at constant amplitude and frequency, the frequency being adjustable. This oscillator comprises a conventional circuit including coil 138 wound on an adjustable ferrite core 140, the adjustment of the latter providing for setting of frequency of the oscillator. The transistor involved in this oscillator is indicated at 142. For the purpose of securing high stability and constancy of operation the oscillator is powered through the leads 144 and 146 connected across a Zener diode 148 which maintains a constant supply voltage.

The output from the collector of the transistor is delivered through capacitor 150 to a parallel resonant network which consists of the winding 118 and fixed capacitor 152 together with incidental distributed capacities. While this resonant network might be tuned to be resonant near a predetermined frequency of the oscillator, it is more convenient to provide adjustment of the oscillator frequency with respect to the resonant frequency of the fixed network by adjustment of the core 140. The particular frequency used is not critical, but a frequency of about 100 kilocycles per second has been found very suitable.

The output of the resonant circuit is fed to the base of a transistor 154 which is biased in usual fashion through resistors for class C operation, providing a direct component of current through the collector due to this operation which is a function of the excitation of the base, the alternating component of the collector current being bypassed by capacitor 159. The resistor illustrated at 153 is desirably a thermistor to provide temperature compensation and may be chosen to suit the other components to provide this compensation. A feedback network comprising the capacitor 155 and resistor 157 is provided between the transistor collector and its base for the purpose of damping oscillations.

The collector of transistor 154 is connected to one terminal of the coil 104 which receives the direct component of its current. From the other terminal of this coil and from the line 146 previously mentioned there runs the transmission line comprising the conductors 156 and 158, the dotted lines here indicating the possibility of a long two-wire transmission line which may join the parts of the apparatus already described to those which follow.

At the ends of the lines 156 and 158 connections are made to direct current supply terminals 160 providing voltage and current suitable for the operation of the transistors used. In one of the lines, in series with the supply terminals, there is indicated a load resistor 162 from the ends of which the output is taken as to a meter 164, which may be of indicating or recording type, and/or a controller indicated at 166. The load resistance which is indicated separately at 162 may, of course, be internal to either 164 or 166. The controller 166 which is used may be of any suitable type and need not be detailed. It may be used to effect control of the process variable which gives rise to the differential pressure undergoing measurement, as, for example, by control of a valve in a case in which flow is the variable and is being measured by the pressure drop across an orifice.

The overall operation is as follows:

The output of the oscillator, which, as described, has a fixed frequency and amplitude, controls the input to the amplifier involving the transistor 154 through the parallel circuit of coil 118 and capacitor 152. The action is dependent upon the variation of inductance of this coil as the gap of its core is to a greater or less extent bridged by the ferrite element 116. In a typical arrangement a relative movement between the core and element 116 of only 0.001 inch will produce a full scale change in the current through the coil 104. This sensitivity is such that from a practical standpoint the position of the element 116 is essentially fixed and fixes the positions of all of the mechanical parts of the system including that of the diaphragm 18. Any deviation of diaphragm 18, and consequently lever 40, from a balanced position will result through the linkage already described in movement of the element 116 which, controlling current through the coil 104, will restore the force balance.

Since the torque exerted on the coil 104 is linearly proportional to the current therethrough, and the force required for balance is directly proportional to the differential pressure across the diaphragm 18, it will be evident that when the balance is automatically restored the current through the coil will be a direct linear measure of the differential pressure. Connections are, of course, made so that the restoration of balance is effected as described. From the electrical standpoint operation is adjusted to one side of, but close to the resonant peak of the circuit 118, 152 by adjustment of the frequency of the oscillator by the core 140.

As will be evident from the series connections, the current through the coil 104 is directly measured by the meter 164 and/or the controller 166. Since the oscillator operates at a fixed frequency and amplitude, its operation does not variably affect the current through the resistor 162, and the spacing between the core of winding 118 and the element 116 is maintained very nearly constant.

It will be evident that since the measurement is made in terms of a variable direct current the length of the two-wire transmission line 156, 158 is quite immaterial. Only two conductors, furthermore, are involved both for supplying power to the apparatus from the terminals 160 and for measurement. The transistor 142 operates at a lower power level than the transistor 154 so that the Zener diode 148 in the emitter circuit of the latter may properly maintain substantially constant operation of the oscillator. Even if small variations in current taken by the oscillator did exist, that would not affect the operation, since that is dependent on the current through the coil 104 which is directly measured.

Because of the fact that the moving parts are automatically restored to a null position with only minute deviation therefrom when the input differential pressure changes, it will be evident that the spring 88 enters into the operation purely as a null adjustment, thereafter during operation applying a substantially constant torque to its mechanical lever system.

The range adjustment is simple involving merely a change of relative lever arms as will be evident.

The attainment of other objectives heretofore mentioned will now be obvious from the description and these matters need not be elaborated.

While the diaphragm assembly has been shown and described as it would be provided for the measurement of small ranges of differential pressure, if larger ranges of this are to be measured the diaphragm 18 may be replaced by an assembly in which suitably different areas are presented to the high and low pressure inlet connections, again, desirably, through isolating diaphragms such as 12 and 16. It may be noted that the arrangement is commercially advantageous in that such a transformation from low pressure ranges to higher pressure ranges may be effected merely by replacing the diaphragm assembly shown at the lower portion of FIGURE 1, the mechanical elements above the lever 40 and connected thereto remaining the same.

Obvious modifications in detail may also be made if the differential pressures to be measured are subatmospheric.

It will be evident that various changes in embodiments of the invention may be made without departing from the scope thereof as defined in the following claims.

What is claimed is:

1. Apparatus providing an output corresponding to differential pressure comprising a pair of flexible elements subject respectively to pressures the difference of which is to provide said output, means defining a pair of chambers between said flexible elements and including a third flexible element constituting a wall between said chambers, liquid within said chambers transmitting pressures exerted on said first mentioned flexible elements to opposite sides of the third flexible element, a lever having two portions one of which is within one of said chambers and the other of which is external thereto, means connecting said lever within the last mentioned chamber to the third flexible element for movement therewith, a flexible diaphragm element closing the last mentioned chamber and secured to said lever to provide a pivotal mounting therefor, the external portion of said lever being provided by two parts, a spring normally holding said two parts in fixed relationship to each other but yielding upon excessive movements of the portion of said lever within its chamber, means detecting the position of said lever, means responsive to the detecting means to apply a force to said lever to maintain it in a predetermined position, and means providing an output corresponding to said force.

2. Apparatus providing an output corresponding to differential pressure comprising a flexible element subject to pressures, the difference of which is to provide said output, on its opposite faces, a lever having two portions, means providing a pivotal mounting for said lever between its two portions, means connecting one of said portions to said flexible element for movement therewith, the other portion of said lever comprising two parts, a first of which parts is rigid with the first portion, and the second of which parts is movable with respect to the first part, means for limiting movement of the second part, means normally holding said parts rigidly together but permitting relative movement thereof upon excessive movement of the first part of the lever beyond that permitted by said movement limiting means for said second part, means detecting the position of said second part, means responsive to the detecting means to apply a force to said lever to maintain said second part in a predetermined position, and means providing an output coresponding to said force.

3. Apparatus providing an output corresponding to differential pressure comprising a flexible element subject to pressures, the difference of which is to provide said output, on its opposite faces, a lever having first and second parts, means providing a pivotal mounting for the first part, means connecting the first part of said flexible element for movement therewith, the second of said parts being movable with respect to the first part, means for limiting movement of the second part, means normally holding said parts rigidly together but permitting relative movement thereof upon excessive movement of the first part of the lever beyond that permitted by said movement limiting means for said second part, means detecting the position of said second part, means responsive to the detecting means to apply a force to said lever to maintain said second part in a predetermined position, and means providing an output corresponding to said force.

4. Apparatus providing an output corresponding to an applied force comprising a lever, means providing a pivot for said lever, means applying the applied force to said lever at a point spaced from said pivot, a spring applying a force to said lever in opposition to the applied force, means detecting the position of said lever, and means responsive to the detecting means to apply a force to said lever to maintain it in a predetermined position, said means for applying said position-maintaining force comprising means providing a magnetic field, a pivoted current-carrying winding in said field and a connection between said pivoted winding and said lever, the field being substantially constant except for variation due to temperature change, and temperature-responsive means for varying the effective lever arm of said connection with respect to the pivot of said winding to compensate for the variation of said field due to temperature change thereby to maintain the position-maintaining force substantally constantly proportional to current in said winding, said output being provided by the current through said winding.

5. Apparatus providing an output corresponding to differential pressure comprising a pair of flexible elements subject respectively to pressures the difference of which is to provide said output, means defining a pair of chambers between said flexible elements and including a third flexible element constituting a wall between said chambers, liquid within said chambers transmitting pressures exerted on said first mentioned flexible elements to opposite sides of the third flexible element, a lever having two portions one of which is within one of said chambers and the other of which is external thereto, means connecting said lever within the last mentioned chamber to the third flexible element for movement therewith, a flexible diaphragm element closing the last mentioned chamber and secured to said lever to provide a pivotal mounting therefor, said third flexible element having a rigid central portion and an annular flexible portion surrounding said rigid central portion and fixedly held and sealed at its outer periphery, means providing walls extending inwardly from the boundaries of said chambers to provide passages between their faces only at the central regions thereof within the outer boundaries of said rigid central portion of the third flexible element, sealing means for closing the periphery of said rigid central portion against said walls, thereby to trap liquid between said walls and said annular flexible portion of said flexible element if the latter is deflected abnormally, means detecting the position of said lever, means responsive to the detecting means to apply a force to said lever to maintain it in a predetermined position, and means providing an output corresponding to said force.

References Cited by the Examiner
UNITED STATES PATENTS

| | | | |
|---|---|---|---|
| 2,752,949 | 7/1956 | Jones | 73—406 X |
| 2,808,725 | 10/1957 | Booth et al. | 73—406 |
| 3,061,823 | 10/1962 | Crossley | 73—407 X |
| 3,085,437 | 4/1963 | Osterstrom | 73—407 |
| 3,140,613 | 7/1964 | Hasegawa | 73—407 |
| 3,160,007 | 12/1964 | Tate et al. | 73—407 X |

LOUIS R. PRINCE, *Primary Examiner.*

D. O. WOODIEL, *Assistant Examiner.*